United States Patent
Sugiyama (10) Patent No.: US 9,571,203 B2
(45) Date of Patent: *Feb. 14, 2017

(54) OPTICAL MODULATOR AND OPTICAL TRANSMITTER

(71) Applicant: FUJITSU OPTICAL COMPONENTS LIMITED, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,588

(22) Filed: Mar. 8, 2016

(65) Prior Publication Data

US 2016/0191169 A1    Jun. 30, 2016

Related U.S. Application Data (63) Continuation of application No. 13/970,804, filed on Aug. 20, 2013, now Pat. No. 9,316,887.

(30) Foreign Application Priority Data

Oct. 30, 2012  (JP) ................. 2012-239064

(51) Int. Cl.
*G02F 1/225* (2006.01)
*H04B 10/532* (2013.01)
(Continued)

(52) U.S. Cl.
CPC ........... *H04B 10/532* (2013.01); *G02F 1/2255* (2013.01); *H04J 14/06* (2013.01); *G02F 2001/212* (2013.01); *G02F 2201/126* (2013.01)

(58) Field of Classification Search
CPC  G02F 1/011; G02F 2001/0113; G02F 1/0121; G02F 1/0123; G02F 1/025; G02F 1/03; G02F 1/0305; G02F 1/0316; G02F 1/0327; G02F 1/0344; G02F 1/035; G02F 1/0356; G02F 1/065; G02F 1/21; G02F 2001/212; G02F 1/225; G02F 1/2255; G02F 1/2257

See application file for complete search history.

(56) References Cited

U.S. PATENT DOCUMENTS 6,033,126 A    3/2000  Omori et al.
8,098,997 B2   1/2012  Sugiyama
(Continued)

FOREIGN PATENT DOCUMENTS

JP    2010-185979    8/2010
JP    2011-138049    7/2011
(Continued)

OTHER PUBLICATIONS

Japanese Office Action dated Jan. 26, 2016 in corresponding Japanese Patent Application No. 2012-239064.
(Continued)

*Primary Examiner* — John M Bedtelyon
(74) *Attorney, Agent, or Firm* — Staas & Halsey LLP (57) ABSTRACT

An optical modulator includes a package that accommodates therein a first substrate and a second substrate different from the first substrate, and outside the package, a flexible circuit board. The first substrate has plural optical modulating units disposed thereon in parallel and each including a Mach-Zehnder optical waveguide. Plural first signal line paths corresponding to the optical modulating units are disposed on the second substrate. Plural second signal line paths corresponding to the optical modulating units are disposed on the flexible circuit board. Electrical lengths of the second signal line paths are different from one another. Electrical lengths of signal paths that span from input ends of the second signal line paths corresponding to the optical modu- (Continued)

lating units to base points on signal electrodes, via the first signal line paths, are equal to one another.

14 Claims, 10 Drawing Sheets

(51) Int. Cl.
*H04J 14/06* (2006.01)
*G02F 1/21* (2006.01)

(56) References Cited

U.S. PATENT DOCUMENTS

| | | | |
|---|---|---|---|
| 8,135,242 | B2 | 3/2012 | Sugiyama |
| 8,411,349 | B2 | 4/2013 | Mitomi et al. |
| 8,467,634 | B2 | 6/2013 | Sugiyama |
| 8,712,195 | B2 | 4/2014 | Sugiyama |
| 2010/0202723 | A1 | 8/2010 | Sugiyama |
| 2010/0202784 | A1 | 8/2010 | Sugiyama |
| 2011/0157673 | A1 | 6/2011 | Mitomi et al. |
| 2012/0051683 | A1 | 3/2012 | Sugiyama |
| 2014/0119745 | A1 | 5/2014 | Sugiyama et al. |
| 2015/0063809 | A1 | 3/2015 | Sugiyama et al. |
| 2015/0078763 | A1 | 3/2015 | Sugiyama et al. |

FOREIGN PATENT DOCUMENTS

| | | |
|---|---|---|
| JP | 2011-238848 | 11/2011 |
| JP | 2012-048121 | 3/2012 |
| WO | WO 2010/021193 | 2/2010 |

OTHER PUBLICATIONS

Office Action dated Jul. 6, 2015 in related U.S. Appl. No. 13/970,804.
Notice of Allowance dated Dec. 4, 2015 in related U.S. Appl. No. 13/970,804.
Corrected Notice of Allowability dated Feb. 10, 2016 in related U.S. Appl. No. 13/970,804.
U.S. Appl. No. 13/970,804, filed Aug. 20, 2013, Masaki Sugiyama, Fujitsu Optical Components Limited.
Japanese Office Action dated Sep. 6, 2016 in corresponding Japanese Patent Application No. 2012-239064 (3 pages) (2 pages English Translation).

OPTICAL MODULATOR AND OPTICAL TRANSMITTER

CROSS REFERENCE TO RELATED APPLICATIONS

This application is a continuation of U.S. application Ser. No. 13/970,804, filed Aug. 20, 2013, pending, which is based upon and claims the benefit of priority of the prior Japanese Patent Application No. 2012-239064, filed on Oct. 30, 2012, the entire contents of which are incorporated herein by reference.

FIELD

The embodiment discussed herein is related to an optical modulator and an optical transmitter.

BACKGROUND

A conventional optical modulator includes a package accommodating a substrate for optical modulation including an optical waveguide and plural signal electrodes interacting with the optical waveguide; and a wiring substrate including wires connected to the signal terminals. Among such optical modulators is an optical modulator that has wiring with numerous turns on the wiring substrate such that the electrical length of the wires differ from one another, whereby the optical modulator adjusts the phase differences among high-frequency electrical signals input into the signal electrodes (see, e.g., Domestic Republication of PCT International Publication for Patent Application, Publication No. 2010/021193). Another optical modulator uses a flexible wiring board as a wiring substrate (see, e.g., Japanese Laid-Open Patent Publication No. 2011-138049).

However, in such conventional optical modulators, the wires are disposed to have numerous turns on the wiring substrate and therefore, the size of the wiring substrate increases. The wiring substrate is disposed inside the package and therefore, a problem arises in that the size of the package increases by an amount corresponding to the increase in the size of the wiring substrate.

SUMMARY

According to an aspect of an embodiment, an optical modulator includes a first substrate that has a Mach-Zehnder optical waveguide that is formed on a substrate having an electro-optical effect; a signal electrode and a ground electrode that are disposed along a pair of branching waveguides positioned between an optical branching unit and an optical coupling unit of the Mach-Zehnder optical waveguide; plural optical modulating units that are disposed in parallel, and respectively modulate a light beam propagating in the Mach-Zehnder optical waveguide by applying to the signal electrode to be a travelling wave electrode, an electrical signal that corresponds to modulation data; and an output optical coupling unit that couples modulated light beams output from the optical modulating units. The optical modulator further has a second substrate that is disposed separately from the first substrate and has plural first signal line paths corresponding to the optical modulating units; a package that accommodates therein the first substrate and the second substrate; and a flexible circuit board that is disposed outside the package and has plural second signal line paths corresponding to the optical modulating units. Input ends of input electrodes of the optical modulating units on the first substrate are each supplied the electrical signal and are disposed side by side on one side face of the first substrate. When base points are independently set such that each optical path length from the output light beam wave coupling unit in a branching waveguide disposed along the signal electrode of each pair of branching waveguides of the optical modulating units is equivalent, each electrical length from an input end of each signal electrode to each respective base point differs. Input ends of the first signal line paths on the second substrate are respectively supplied the electrical signals respectively corresponding to the optical modulating units and are disposed side by side on one side face of the second substrate. Output ends electrically connected to input ends of the signal electrodes of the corresponding optical modulating units on the first substrate are disposed side by side on another side face of the second substrate. Input ends of the second signal line paths on the flexible circuit board are respectively supplied the electrical signals respectively corresponding to the optical modulating units and are disposed side by side on one side face of the flexible circuit board, and output ends electrically connected to input ends of the corresponding first signal line paths on the second substrate are disposed side by side on another side face of the flexible circuit board. Electrical lengths from the input ends of the second signal line paths to output ends thereof respectively differ. Electrical lengths of signal paths respectively corresponding to the optical modulating units are equivalent, the signal paths include signal paths that are from the input ends of the second signal line paths and pass through input ends of the first signal line paths connected to the output ends of the second signal line paths, to the base points on the signal electrodes, and signal paths that are from the input ends of the first signal line paths and pass through the input ends of the signal electrodes connected to output ends of the first signal line paths, to the base points on the signal electrodes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A preferred embodiment of an optical modulator and an optical transmitter will be described in detail with reference to the accompanying drawings. In the description of each of the following examples, identical components are given identical reference numerals and redundant description is omitted.

Figure 1:
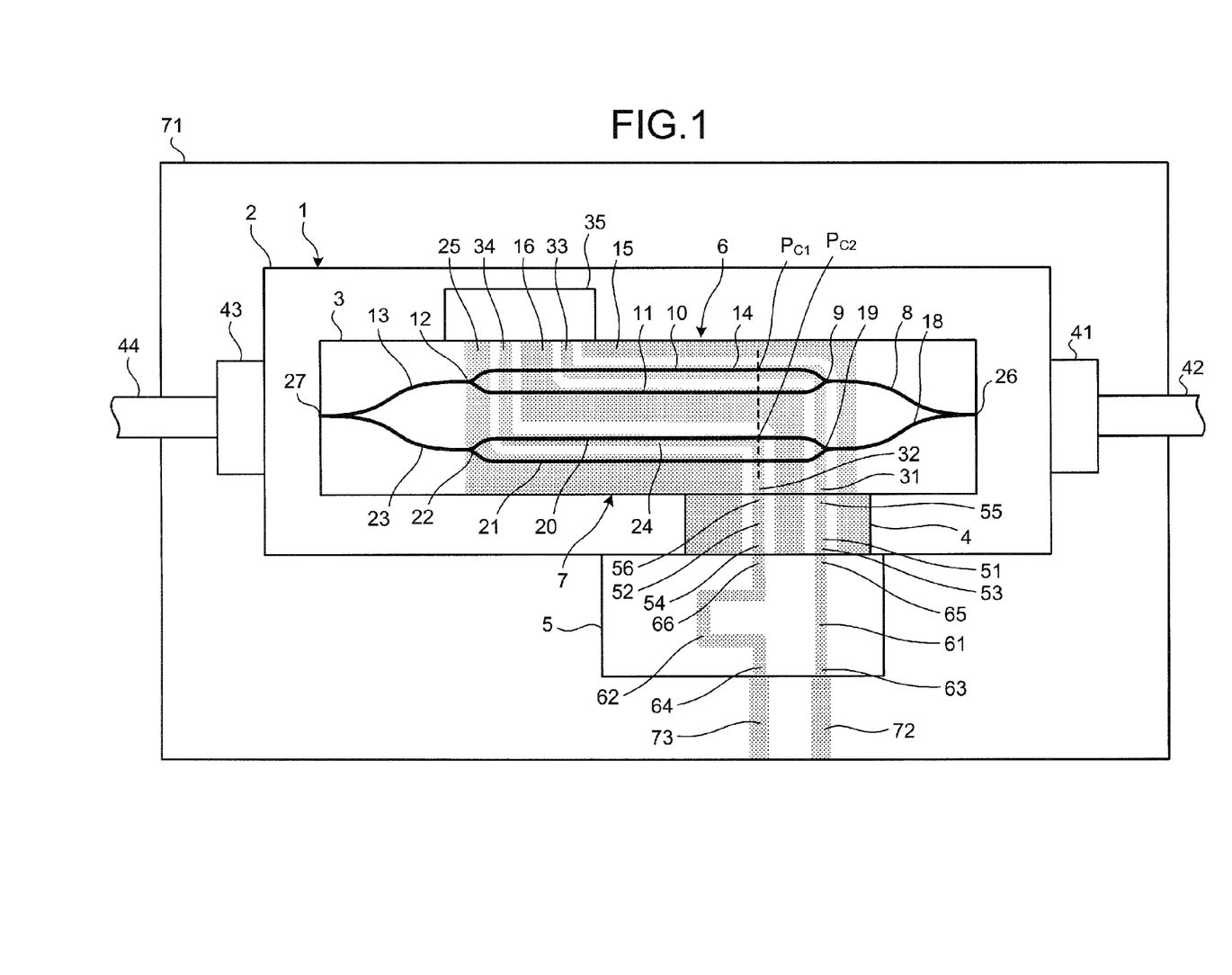
FIG. 1 is an explanatory diagram of a first example of an optical modulator according an embodiment.

FIG. 1 is an explanatory diagram of a first example of an optical modulator according the embodiment. As depicted in FIG. 1, an optical modulator 1 includes a package 2 that accommodates therein a first substrate 3 and a second substrate 4 different from the first substrate 3; and a flexible circuit board 5 outside the package. The first substrate 3 is a substrate for an optical modulator chip.

The first substrate 3 may be a z-cut crystal substrate having an electro-optical effect such as, for example, $LiNbO_3$ (hereinafter, simply referred to as "LN") or $LiTaO_2$. An optical waveguide device using such an electro-optical crystal may be formed by forming an optical waveguide of a metal film such as Ti on a portion of the crystal substrate and causing the film to thermally diffuse, or by exchanging protons in benzoic acid after patterning; and by disposing electrodes in the vicinity of the optical waveguide.

Plural optical modulating units are disposed in parallel on the first substrate 3. In the example depicted in FIG. 1, two optical modulating units 6 and 7 are disposed in parallel, where the first optical modulating unit 6 is located in an upper position in FIG. 1 and the second optical modulating unit 7 is located in a lower position in FIG. 1. Although the number of optical modulating units disposed in parallel is not limited two, the description will be made for the embodiment taking a case where the number of optical modulating units is two, as an example. The first and the second optical modulating units 6 and 7 each include a Mach-Zehnder optical waveguide formed on the substrate that has the electro-optical effect.

In the first optical modulating unit 6, the Mach-Zehnder optical waveguide includes a first input waveguide 8, a first optical branching unit 9, a first and a second branching waveguides 10 and 11, a first optical coupling unit 12, and a first output waveguide 13. The first and the second branching waveguides 10 and 11 are disposed in parallel between the first optical branching unit 9 and the first optical coupling unit 12.

In the first optical modulating unit 6, a first signal electrode 14 is disposed along the first branching waveguide 10 and ground electrodes 15 and 16 are disposed along the second branching waveguide 11. The ground electrodes 15 and 16 and the first signal electrode 14 form a coplanar electrode. When a Z-cut substrate is used, the first signal electrode 14 is disposed immediately above the first branching waveguide 10 and the ground electrode 16 is disposed immediately above the second branching waveguide 11. Thereby, variation of the refraction index can be used that is caused by the electric field in the Z-direction.

A buffer layer having a thickness of, for example, about 0.2 to 2 μm formed using $SiO_2$, etc., may be disposed between the electro-optical crystal, and the first signal electrode 14 and the ground electrode 16. Thereby, light beams propagating in the first and the second branching waveguides 10 and 11 are prevented from being absorbed respectively by the first signal electrode 14 and the ground electrode 16.

In the second optical modulating unit 7, the Mach-Zehnder optical waveguide includes a second input waveguide 18, a second optical branching unit 19, a third and a fourth branching waveguides 20 and 21, a second optical coupling unit 22, and a second output waveguide 23. The third and the fourth branching waveguides 20 and 21 are disposed in parallel between the second optical branching unit 19 and the second optical coupling unit 22.

In the second optical modulating unit 7, a second signal electrode 24 is disposed along the third branching waveguide 20 and ground electrodes 25 and 16 are disposed along the fourth branching waveguide 21. The ground electrodes 25 and 16 and the second signal electrode 24 form a coplanar electrode. When the Z-cut substrate is used, the second signal electrode 24 is disposed immediately above the third branching waveguide 20 and the ground electrode 25 is disposed immediately above the fourth branching waveguide 21. Thereby, variation of the refraction index can be used that is caused by the electric field in the Z-direction.

A buffer layer having a thickness of, for example, about 0.2 to 2 μm formed using $SiO_2$, etc., may be disposed between the electro-optical crystal, and the second signal electrode 24 and the ground electrode 25. Thereby, light beams propagating in the third and the fourth branching waveguides 20 and 21 are prevented from being absorbed respectively by the second signal electrode 24 and the ground electrode 25.

An input end 31 supplied with an electrical signal and corresponding to the first optical modulating unit 6, of the first signal electrode 14, and an input end 32 supplied with the electrical signal and corresponding to the second optical modulating unit 7, of the second signal electrode 24 are disposed side by side on one side face of the first substrate 3. In the example depicted in FIG. 1, the input ends 31 and 32 of the first and the second signal electrodes 14 and 24 are disposed side by side on a lower side face of the first substrate 3.

Ends 33 and 34 of the first and the second signal electrodes 14 and 24 are disposed side by side in an end portion 35 on another side face of the first substrate 3. In the example depicted in FIG. 1, the ends 33 and 34 of the first and the second signal electrodes 14 and 24 are disposed side by side on the upper side face of the first substrate 3 in FIG. 1.

In the end portion 35, the end 33 of the first signal electrode 14 is connected to an end of the ground electrode 16 through a resistor not depicted. Thereby, the first signal electrode 14 is a travelling wave electrode. When a first electrical signal of a microwave corresponding to modulation data is applied to the input end 31 of the first signal electrode 14, the refraction indexes of the first and the second branching waveguides 10 and 11 are respectively varied by $+\Delta n_1$ and $-\Delta n_2$ by the generated electric field. Thereby, the phase difference is varied between the first and the second branching waveguides 10 and 11, and a signal light beam output from the first output waveguide 13 is intensity-modulated by Mach-Zehnder interference.

In the end portion 35, the end 34 of the second signal electrode 24 is connected to an end of the ground electrode 25 through a resistor not depicted. Thereby, the second signal electrode 24 is a travelling wave electrode. When a second electrical signal of a microwave corresponding to the modulation data is applied to the input end 32 of the second signal electrode 24, the refraction indexes of the third and the fourth branching waveguides 20 and 21 are respectively varied by $+\Delta n_3$ and $-\Delta n_4$ by the generated electric field. Thereby, the phase difference is varied between the third and the fourth branching waveguides 20 and 21, and a signal light beam output from the second output waveguide 23 is intensity-modulated by Mach-Zehnder interference.

Varying the cross-sectional shapes of the first and the second signal electrodes 14 and 24 can control the effective refraction indexes of the microwaves. Thereby, the speeds of the light beam and the microwave can be matched with each other and a high-speed optical responsiveness can be acquired. The optical modulator 1 depicted in FIG. 1 can produce a multi-level modulation signal based on the fact that the first and the second electrical signals are different from each other.

An input optical branching unit 26 and an output optical coupling unit 27 are formed on the first substrate 3. An optical input end of the input optical branching unit 26 may be connected to, for example, an optical fiber 42 through a connector 41. One optical output end of the input optical branching unit 26 is connected to the first input waveguide 8. The other optical output end of the input optical branching unit 26 is connected to the second input waveguide 18. The input optical branching unit 26 branches, for example, an input light beam input from the optical fiber 42 through the connector 41 into two light beams at intensity ratio of, for example, 1:1 and outputs the two light beams to the first and the second input waveguides 8 and 18.

One optical input end of the output optical coupling unit 27 is connected to the first output waveguide 13. The other optical input end of the output optical coupling unit 27 is connected to the second output waveguide 23. The optical output end of the output optical coupling unit 27 may be connected to, for example, an optical fiber 44 through a connector 43. The output optical coupling unit 27 may couple the modulated light beams output from the first and the second output waveguides 13 and 23, and may output the coupled light beam to the optical fiber 44 through the connector 43.

For each of the first and the third branching waveguides 10 and 20, a base point is independently set such that the optical path length from the output optical coupling unit 27 to the base point is equivalent for the first and the third branching waveguides 10 and 20. In the description below, the base point in the first branching waveguide 10 may be denoted by "$P_{C1}$" and the base point in the third branching waveguide 20 may be denoted by "$P_{C2}$". Such electrical lengths are different from each other as those respectively from the input ends 31 and 32 of the first and the second signal electrodes 14 and 24 to the base points $P_{C1}$ and $P_{C2}$ in the first and the third branching waveguides 10 and 20.

The second substrate 4 may be, for example, a ceramic substrate, and have plural first signal line paths 51 and 52 disposed thereon that respectively correspond to the optical modulating units 6 and 7. In the description below, the first signal line path 51 corresponding to the first optical modulating unit 6 may be referred to as "first-1 signal line path 51" and the first signal line path 52 corresponding to the second optical modulating unit 7 may be referred to as "first-2 signal line path 52".

An input end 53 of the first-1 signal line path 51 is supplied the electrical signal and corresponds to the first optical modulating unit 6, and an input end 54 of the first-2 signal line path 52 is supplied the electrical signal and corresponds to the second optical modulating unit 7. The input ends 53 and 54 are disposed side by side on one side face of the second substrate 4. In the example depicted in FIG. 1, the input ends 53 and 54 of the first-1 and the first-2 signal line paths 51 and 52 are disposed side by side on the lower side face of the second substrate 4 in FIG. 1.

An output end 55 of the first-1 signal line path 51 and an output end 56 of the first-2 signal line path 52 are disposed side by side on the other side face of the second substrate 4. In the example depicted in FIG. 1, the output ends 55 and 56 of the first-1 and the first-2 signal line paths 51 and 52 are disposed side by side on the upper side face of the second substrate 4 in FIG. 1.

The output end 55 of the first-1 signal line path 51 may electrically be connected to the input end 31 of the first signal electrode 14 by, for example, wire bonding. The output end 56 of the first-2 signal line path 52 may electrically be connected to the input end 32 of the second signal electrode 24 by, for example, wire bonding. An electrode pad not depicted may be disposed for each of the output end 55 of the first-1 signal line path 51, the output end 56 of the first-2 signal line path 52, the input end 31 of the first signal electrode 14, and the input end 32 of the second signal electrode 24, and a wire may be bonded to the electrode pad.

The flexible circuit board 5 has plural second signal line paths 61 and 62 disposed thereon that respectively correspond to the optical modulating units 6 and 7. In the description below, the second signal line path 61 corresponding to the first optical modulating unit 6 may be referred to as "second_1 signal line path 61" and the second signal line path 62 corresponding to the second optical modulating unit 7 may be referred to as "second_2 signal line path 62".

An input end 63 of the second_1 signal line path 61 is supplied the electrical signal and corresponds to the first optical modulating unit 6, and an input end 64 of the second_2 signal line path 62 is supplied the electrical signal and corresponds to the second optical modulating unit 7. The input ends 63 and 64 are disposed side by side on one side face of the flexible circuit board 5. In the example depicted in FIG. 1, the input ends 63 and 64 of the second_1 and the second_2 signal line paths 61 and 62 are disposed side by side on the lower side face of the flexible circuit board 5 in FIG. 1.

An output end 65 of the second_1 signal line path 61 and an output end 66 of the second_2 signal line path 62 are disposed side by side on the other side face of the flexible circuit board 5. In the example depicted in FIG. 1, the output end 65 of the second_1 signal line path 61 and the output end 66 of the second_2 signal line path 62 are disposed side by side on the upper side face of the flexible circuit board 5 in FIG. 1.

The output end 65 of the second_1 signal line path 61 may electrically be connected to, for example, the input end 53 of the first-1 signal line path 51 through an electric connector not depicted disposed on the side face of the package 2. The output end 66 of the second_2 signal line path 62 may electrically be connected to, for example, the input end 54 of the first-2 signal line path 52 through an electric connector not depicted disposed on the side face of the package 2.

The input portions for the electrical signals to the optical modulator 1 are disposed side by side on the one side of the package 2 as above and thereby, the optical modulator 1 can easily be mounted on, for example, a printed circuit board 71. The area to have the optical modulator 1 mounted therein can be reduced. For example, the printed circuit board 71 and the input portions of the electrical signals to the optical modulator 1 are connected to each other using the flexible circuit board 5 and, thereby, the area to have the optical modulator 1 mounted therein can be reduced.

Electrical lengths are different from each other such as that from the input end 63 of the second_1 signal line path 61 to the output end 65 of the second_1 signal line path 61 and that from the input end 64 of the second_2 signal line path 62 to the output end 66 of the second_2 signal line path 62. For example, in the example depicted in FIG. 1, the second_1 signal line path 61 extends in a straight line in a direction that crosses at a right angle the longitudinal direction of the first substrate 3, that is, the widthwise direction of the first substrate 3.

On the other hand, the second_2 signal line path 62: extends from the input end 64 in the widthwise direction of the first substrate 3; curves midway into the longitudinal direction of the first substrate 3; again curves into the widthwise direction of the first substrate 3; again curves into a reverse direction of the longitudinal direction of the first substrate 3; again curves into the widthwise direction of the first substrate 3; and reaches the output end 66. The electrical length of the second_2 signal line path 62 is longer than the electrical length of the second_1 signal line path 61 by the length that corresponds to the length for the second_2 signal line path 62 to go into the longitudinal direction of the first substrate 3 and return therefrom making the four curves.

Electrical lengths are equal to each other such as that of the signal path from the input end 63 of the second_1 signal line path 61 to the base point $P_{C1}$ of the first signal electrode 14 and that of the signal path from the input end 64 of the second_2 signal line path 62 to the base point $P_{C2}$ of the second signal electrode 24. Thereby, when the electrical signal corresponding to the modulation data is simultaneously applied to each of the input ends 63 and 64 of the second_1 and second_2 signal line paths 61 and 62, the electrical signals simultaneously reach the interaction portion of the first branching waveguide 10 and the first signal electrode 14, and the interaction portion of the third branching waveguide 20 and the second signal electrode 24.

Therefore, timings of such modulated light beams match with each other as that output from the first output waveguide 13 and that output from the second output waveguide 23. "Zero skew" is realized between the first and the second optical modulating units 6 and 7.

The loss per unit length of the flexible circuit board 5 will be denoted by "$\alpha_f$", the loss per unit length of the second substrate 4 will be denoted by "$\alpha_c$", and the loss per unit length of the first substrate 3 will be denoted by "$\alpha_m$". As to the second signal line paths 61 and 62 on the flexible circuit board 5, the length of the second_1 signal line path 61 will be denoted by "$L_{f1}$" and the length of the second_2 signal line path 62 will be denoted by "$L_{f2}$". As to the first signal line paths 51 and 52 on the second substrate 4, the length of the first-1 signal line path 51 will be denoted by "$L_{c1}$" and the length of the first-2 signal line path 52 will be denoted by "$L_{c2}$". As to the first signal electrode 14 on the first substrate 3, the length from the input end 31 to the base point $P_{C1}$ will be denoted by "$L_{m1}$" and, as to the second signal electrode 24 on the first substrate 3, the length from the input end 32 to the base point $P_{C2}$ will be denoted by "$L_{m2}$".

Such structures only have to be designed such that the following equation holds, as the signal electrodes 14 and 24, the first signal line paths 51 and 52, and the second signal line paths 61 and 62. Thereby, any difference in the band can be prevented from being generated between the first and the second optical modulating units 6 and 7. The bands of the first and the second optical modulating units 6 and 7 can be equalized.

$$\alpha_f \times L_{f1} + \alpha_c \times L_{c1} + \alpha_m \times L_{m1} = \alpha_f \times L_{f2} + \alpha_c \times L_{c2} + \alpha_m \times L_{m2}$$

The optical modulator 1 may be mounted on, for example, the printed circuit board 71. The input end 63 of the second_1 signal line path 61 may electrically be connected, for example, by soldering to a first signal wire 72 that is formed on the printed circuit board 71. The input end 64 of the second_2 signal line path 62 may electrically be connected, for example, by soldering to a second signal wire 73 that is formed on the printed circuit board 71. The first and the second signal wires 72 and 73 may be connected to a driver not depicted that drives the optical modulator 1. The driver may be mounted on, for example, the printed circuit board 71.

Figure 2:
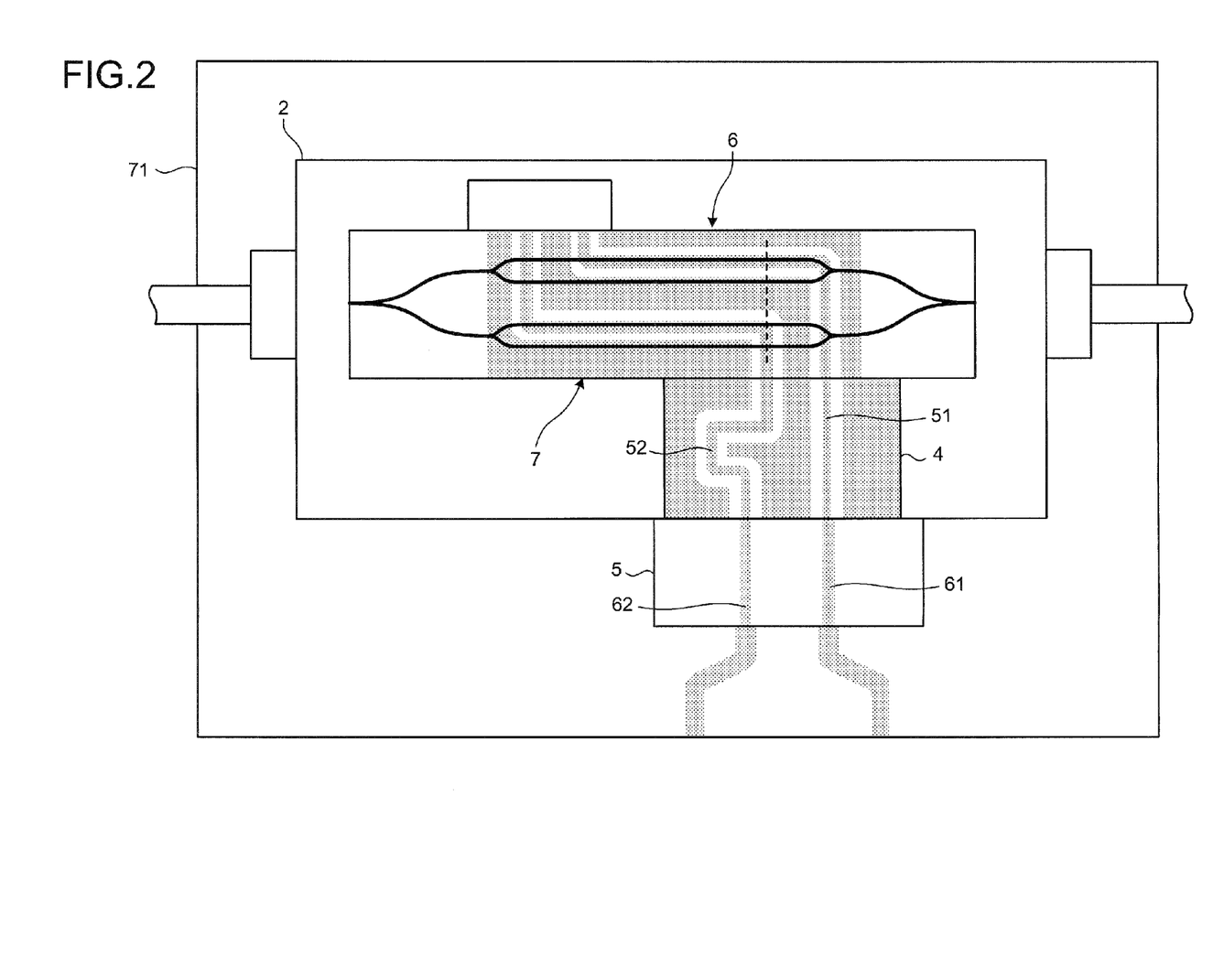
FIG. 2 is an explanatory diagram of another example of the optical modulator.

FIG. 2 is an explanatory diagram of another example of the optical modulator. In an optical modulator depicted in FIG. 2, the first-2 signal line path 52 is formed in a shape to have many curves on the second substrate 4 in the package 2 for the electrical length of the first-2 signal line path 52 to be set to be longer than that of the first-1 signal line path 51 and, thereby, the "zero skew" is realized between the optical modulating units 6 and 7. The electrical lengths of the second_1 and the second_2 signal line paths 61 and 62 are equal to each other on the flexible circuit board 5.

According to the optical modulator 1 depicted in FIG. 1, the electrical lengths are adjusted on the flexible circuit board 5 outside the package 2 and, thereby, the length in the widthwise direction of the first substrate 3 of the second substrate 4 can be shortened compared to the configuration to adjust the electrical lengths on the second substrate 4 in the package 2 as in the example depicted in FIG. 2. Therefore, the size of the package 2 can be reduced.

Figure 3:
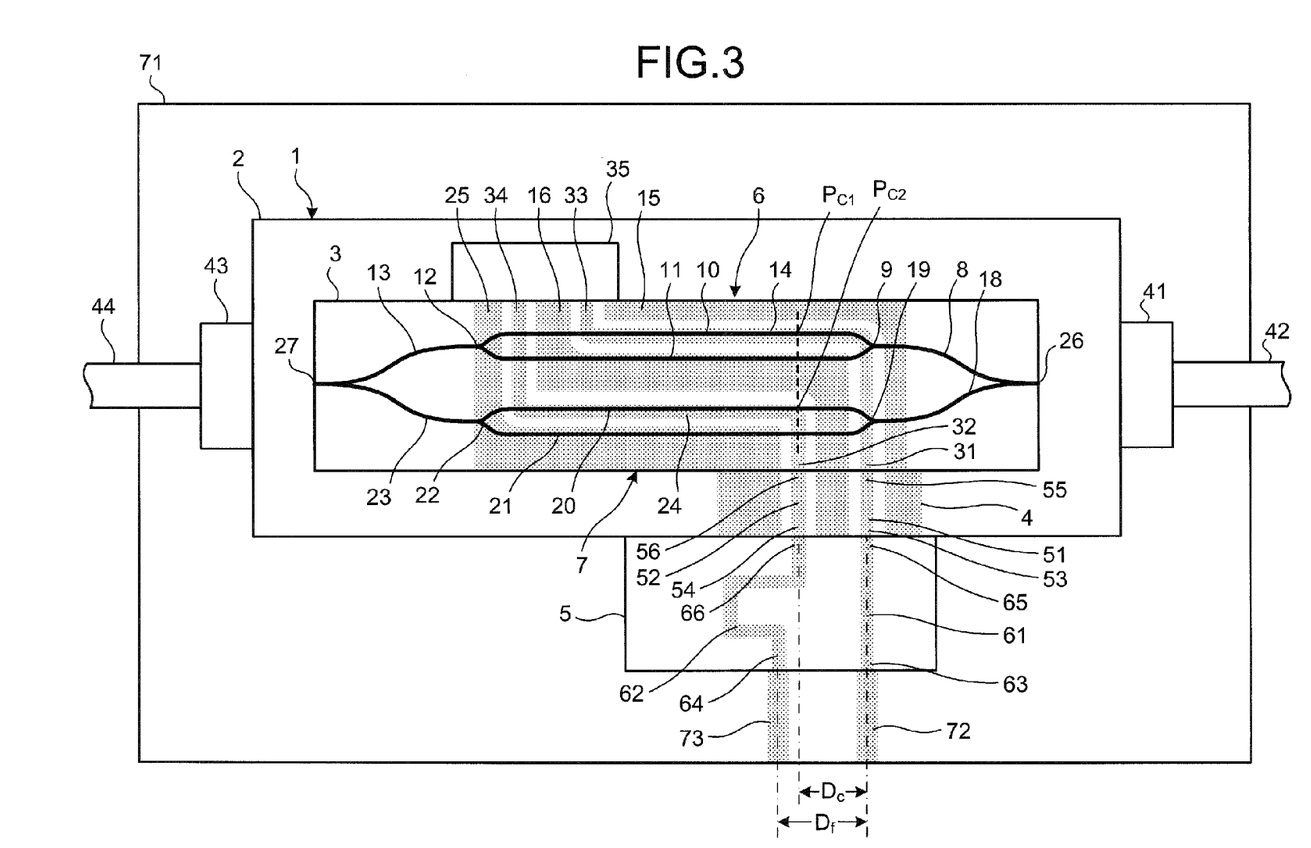
FIG. 3 is an explanatory diagram of a second example of the optical modulator according to the embodiment.

FIG. 3 is an explanatory diagram of a second example of the optical modulator according to the embodiment. In an optical modulator 1 depicted in FIG. 3, an interval $D_f$ between the input end 63 of the second_1 signal line path 61 and the input end 64 of the second_2 signal line path 62 is different from an interval $D_c$ between the input end 53 of the first-1 signal line path 51 and the input end 54 of the first-2 signal line path 52 in the optical modulator 1 depicted in FIG. 1.

In the example depicted in FIG. 3, the interval $D_f$ between the input end 63 of the second_1 signal line path 61 and the input end 64 of the second_2 signal line path 62 is longer than the interval $D_c$ between the input end 53 of the first-1 signal line path 51 and the input end 54 of the first-2 signal line path 52. The other configurations in the second example are same as those of the optical modulator 1 depicted in FIG. 1 and therefore, the same configurations are given the same reference numerals and will not again be described.

According to the optical modulator 1 depicted in FIG. 3, for example, even when an interval between the signal wires 72 and 73 formed on the printed circuit board 71 is longer than an interval between the input ends 31 and 32 of the signal electrodes 14 and 24 on the first substrate 3, the pitch can be converted on the flexible circuit board 5. The conversion of the pitch on the flexible circuit board 5 enables reduction of the length in the widthwise direction of the first substrate 3 of the second substrate 4 compared to the case where the pitch is converted on the second substrate 4. Therefore, the size of the package 2 can be reduced.

Figure 4:
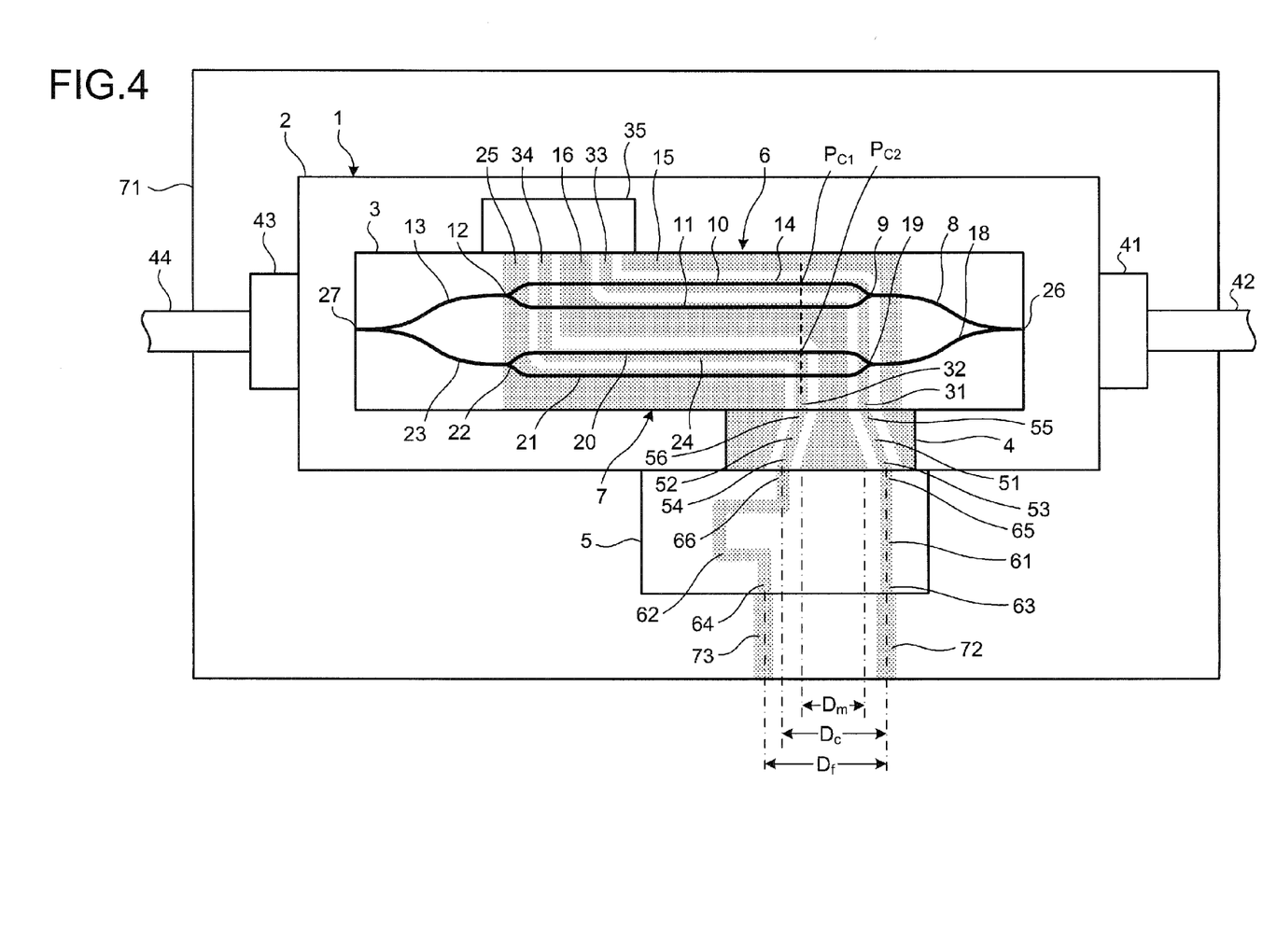
FIG. 4 is an explanatory diagram of a third example of the optical modulator according to the embodiment.

FIG. 4 is an explanatory diagram of a third example of the optical modulator according to the embodiment. In an optical modulator 1 depicted in FIG. 4, the interval $D_f$ between the input end 63 of the second_1 signal line path 61 and the input end 64 of the second_2 signal line path 62 is longer than the interval $D_c$ between the input end 53 of the first-1 signal line path 51 and the input end 54 of the first-2 signal line path 52 in the optical modulator 1 depicted in FIG. 1.

In the optical modulator 1 depicted in FIG. 4, the interval $D_c$ between the input end 53 of the first-1 signal line path 51 and the input end 54 of the first-2 signal line path 52 is longer than the interval $D_m$ between the input end 31 of the first signal electrode 14 and the input end 32 of the second signal electrode 24 in the optical modulator 1 depicted in FIG. 1. The other configurations in the third example are same as those of the optical modulator 1 depicted in FIG. 1 and therefore, the same configurations are given the same reference numerals and will not again be described.

According to the optical modulator 1 depicted in FIG. 4, for example, even when the interval between the signal wires 72 and 73 formed on the printed circuit board 71 is longer than the interval between the input ends 31 and 32 of the signal electrodes 14 and 24 on the first substrate 3, the pitch can be converted on each of the flexible circuit board 5 and the second substrate 4. The conversion of the pitch on each of the flexible circuit board 5 and the second substrate 4 enables reduction of the length in the widthwise direction of the first substrate 3 of the second substrate 4 compared to the case where the conversion of the pitch is executed only on the second substrate 4. Therefore, the size of the package 2 can be reduced.

In the case where the propagation loss on the flexible circuit board 5 is significant, the propagation loss is increased when the pitch is converted only on the flexible circuit board 5 and therefore, an inconvenience may occur that the band degradation is significant. The conversion of the pitch on each of the flexible circuit board 5 and the second substrate 4 as in the optical modulator 1 depicted in FIG. 4 enables suppression of the propagation loss on the flexible circuit board 5 and suppression of the degradation of the bands compared to the case where the conversion of the pitch is executed only on the flexible circuit board 5.

Figure 5:
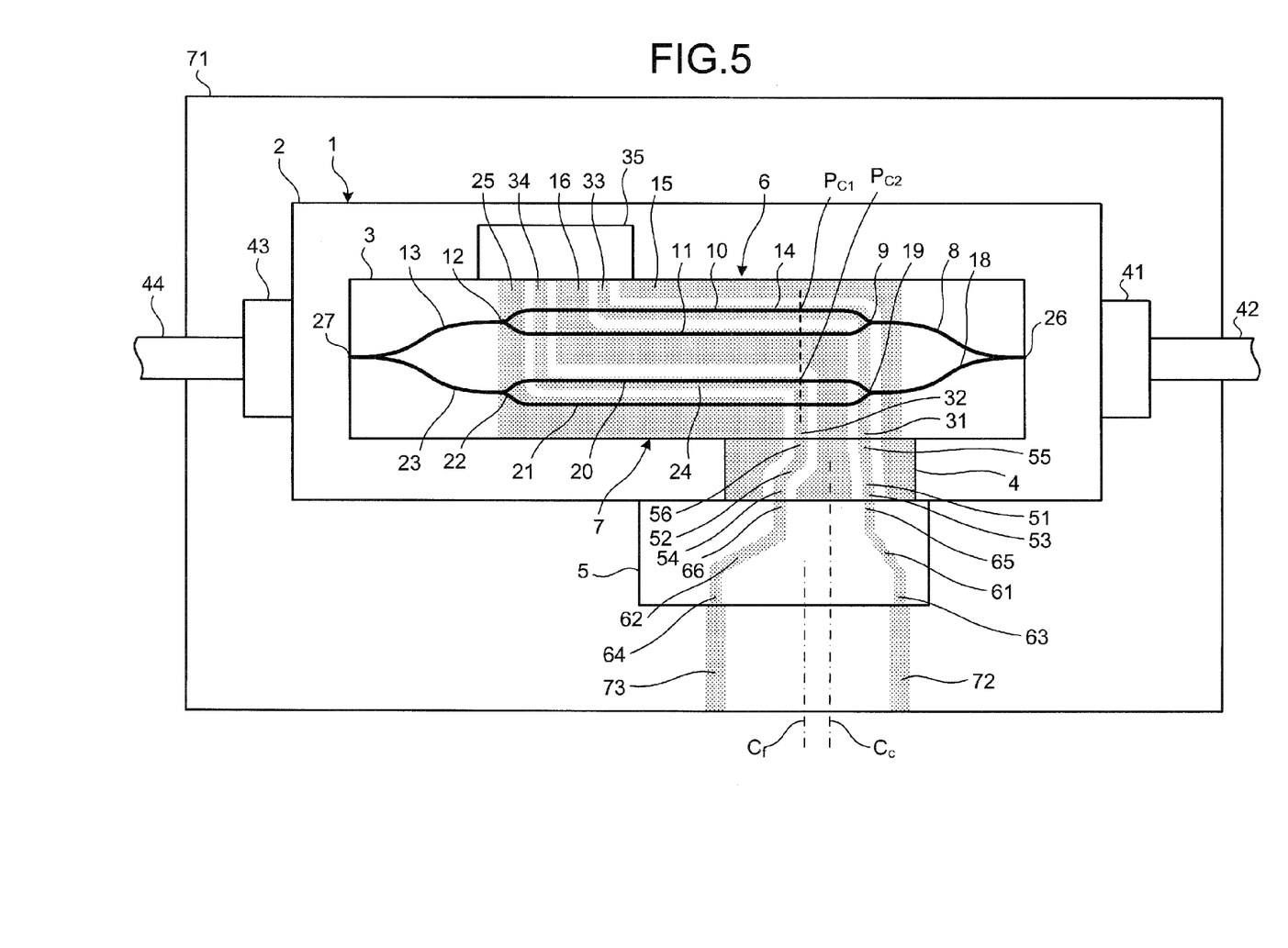
FIG. 5 is an explanatory diagram of a fourth example of the optical modulator according to the embodiment.

FIG. 5 is an explanatory diagram of a fourth example of the optical modulator according to the embodiment. In an optical modulator 1 depicted in FIG. 5, a central line $C_f$ between the input end 63 of the second_1 signal line path 61 and the input end 64 of the second_2 signal line path 62 deviates from a central line $C_c$ between the input end 53 of the first-1 signal line path 51 and the input end 54 of the first-2 signal line path 52 in the optical modulator 1 depicted in FIG. 1.

The second_2 signal line path 62 may be disposed obliquely to the longitudinal direction of the first substrate 3. The second_1 signal line path 61 may be disposed obliquely to the longitudinal direction of the first substrate 3 matched with the interval between the input end 63 of the second_1 signal line path 61 and the input end 64 of the second_2 signal line path 62.

The interval between the input end 63 of the second_1 signal line path 61 and the input end 64 of the second_2 signal line path 62 may be longer than the interval between the input end 53 of the first-1 signal line path 51 and the input end 54 of the first-2 signal line path 52 as in the optical modulator 1 depicted in FIG. 3. The interval between the input end 53 of the first-1 signal line path 51 and the input end 54 of the first-2 signal line path 52 may be longer than the interval between the input end 31 of the first signal electrode 14 and the input end 32 of the second signal electrode 24 as in the optical modulator 1 depicted in FIG. 4. Other components in the fourth example are identical to those of the optical modulator 1 depicted in FIG. 1 and therefore, are given the same reference numerals used in FIG. 1 and will not again be described.

According to the optical modulator 1 depicted in FIG. 5, the electrical length of the second_2 signal line path 62 can be set to be longer than the electrical length of the second_1 signal line path 61 without causing the second_2 signal line path 62 to curve for many times. Therefore, the size of the flexible circuit board 5 can be reduced. The oblique disposition of the second_2 signal line path 62 enables reduction of the length of the second_2 signal line path 62. Therefore, the band of the second optical modulating unit 7 can be widened.

Figure 6:
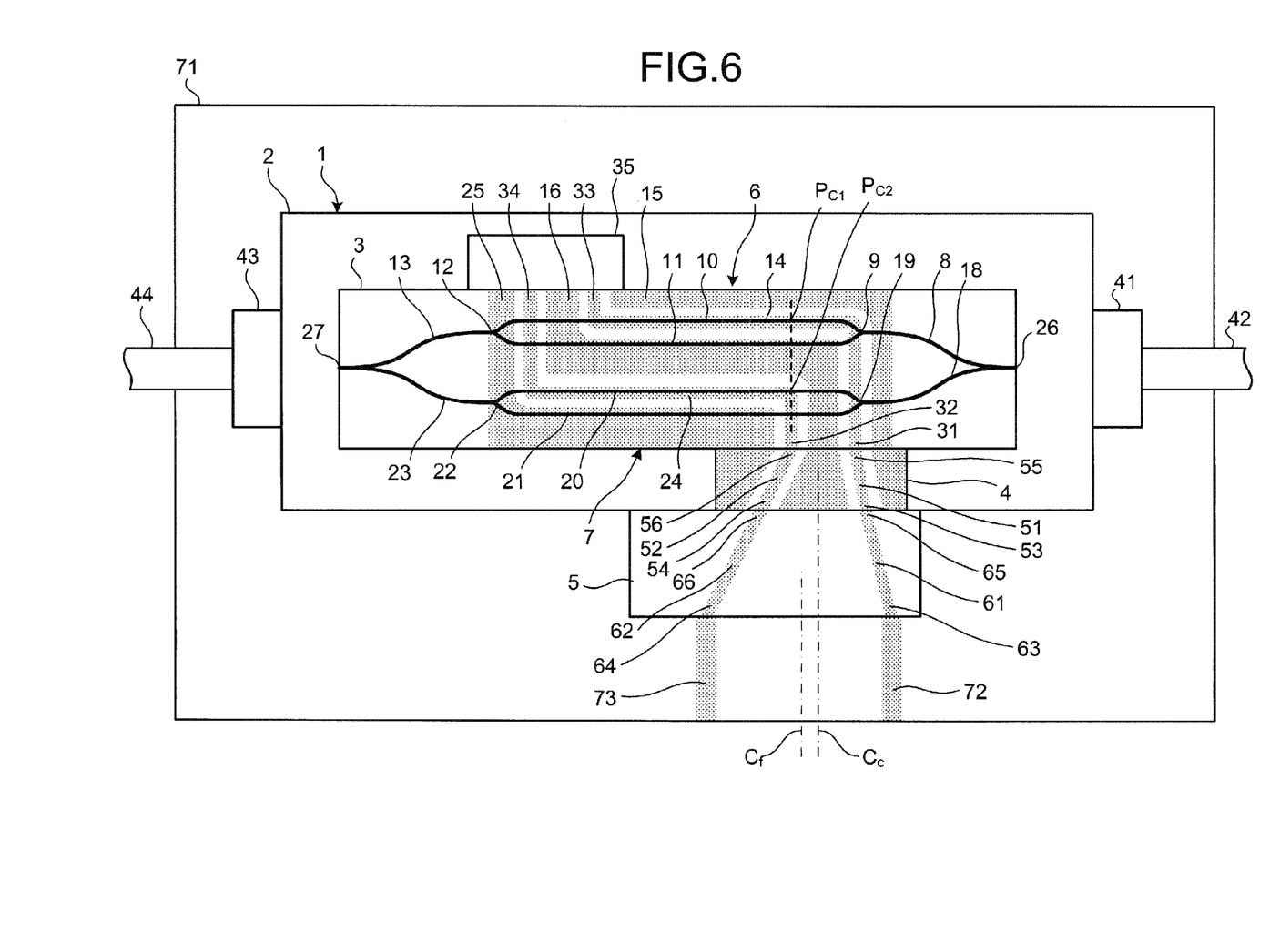
FIG. 6 is an explanatory diagram of a fifth example of the optical modulator according to the embodiment.

FIG. 6 is an explanatory diagram of a fifth example of the optical modulator according to the embodiment. In an optical modulator 1 depicted in FIG. 6, the central line $C_f$ between the input end 63 of the second_1 signal line path 61 and the input end 64 of the second_2 signal line path 62 deviates from the central line $C_c$ between the input end 53 of the first-1 signal line path 51 and the input end 54 of the first-2 signal line path 52 in the optical modulator 1 depicted in FIG. 1.

The second_2 signal line path 62 and the first-2 signal line path 52 are disposed each in a straight line and obliquely to the longitudinal direction of the first substrate 3. The second_1 signal line path 61 and the first-1 signal line path 51 are disposed each in a straight line and obliquely to the longitudinal direction of the first substrate 3 matched with the interval between the input end 63 of the second_1 signal line path 61 and the input end 64 of the second_2 signal line path 62.

The interval between the input end 63 of the second_1 signal line path 61 and the input end 64 of the second_2 signal line path 62 may be longer than the interval between the input end 53 of the first-1 signal line path 51 and the input end 54 of the first-2 signal line path 52 as in the optical modulator 1 depicted in FIG. 3. The interval between the input end 53 of the first-1 signal line path 51 and the input end 54 of the first-2 signal line path 52 may be longer than the interval between the input end 31 of the first signal electrode 14 and the input end 32 of the second signal electrode 24 as in the optical modulator 1 depicted in FIG. 4. Other components in the fifth example are identical to those of the optical modulator 1 depicted in FIG. 1 and therefore, are given the same reference numerals used in FIG. 1 and will not again be described.

According to the optical modulator 1 depicted in FIG. 6, the length can be reduced of the signal path from the input end 64 of the second_2 signal line path 62 to the output end 56 of the first-2 signal line path 52. Therefore, the band of the second optical modulating unit 7 can be widened. The length of the signal path from the input end 64 of the second_2 signal line path 62 to the output end 56 of the first-2 signal line path 52, and the length of the signal path from the input end 63 of the second_1 signal line path 61 to the output end 55 of the first-1 signal line path 51 can both be reduced maintaining the balance between the lengths of these signal paths. Therefore, the propagation loss of any high-frequency signal can be reduced and the modulation band can be widened. The driving voltage during high-speed driving can be reduced.

Figure 7:
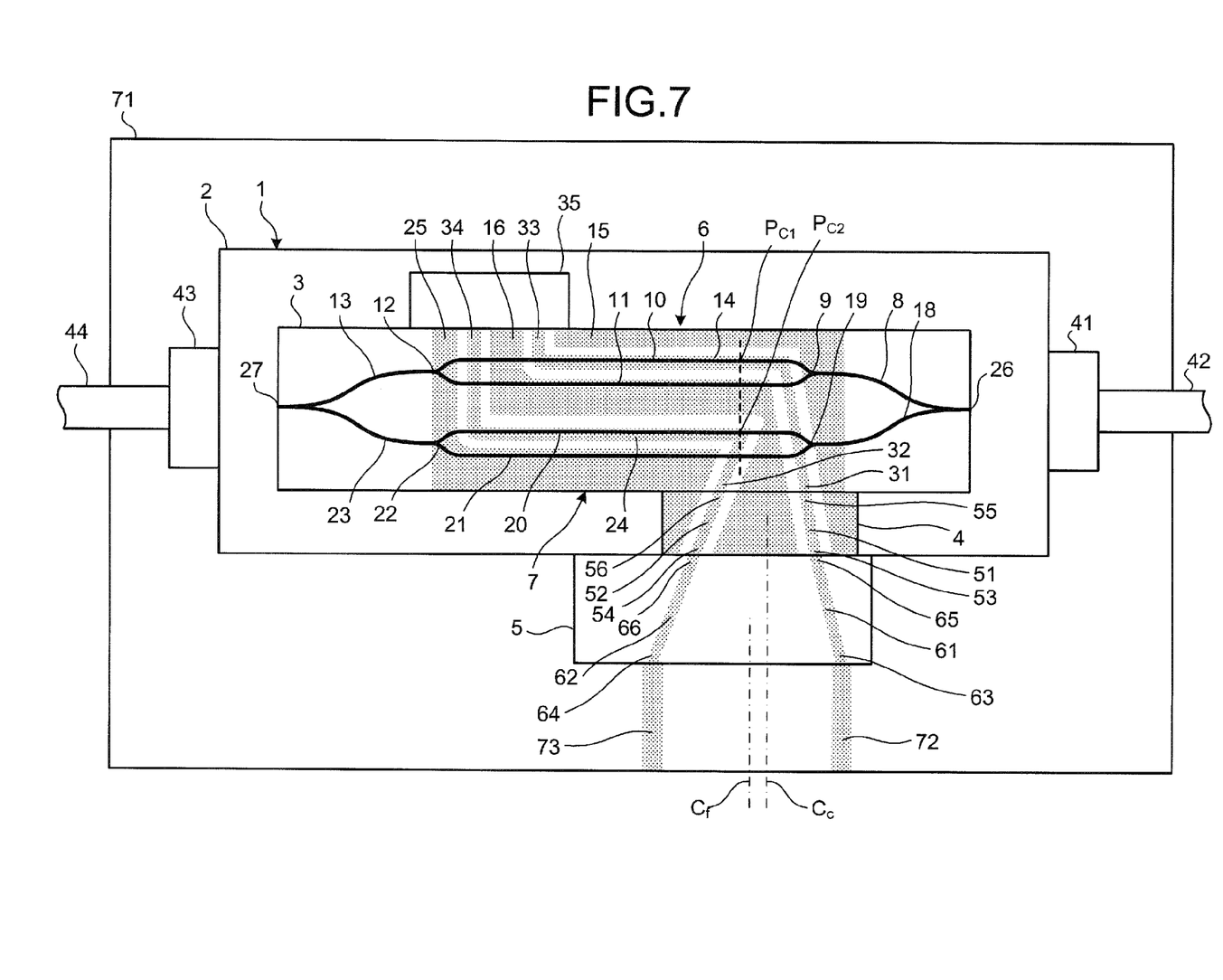
FIG. 7 is an explanatory diagram of a sixth example of the optical modulator according to the embodiment.

FIG. 7 is an explanatory diagram of a sixth example of the optical modulator according to the embodiment. In an optical modulator 1 depicted in FIG. 7, the central line $C_f$ between the input end 63 of the second_1 signal line path 61 and the input end 64 of the second_2 signal line path 62 deviates from the central line $C_c$ between the input end 53 of the first-1 signal line path 51 and the input end 54 of the first-2 signal line path 52 in the optical modulator 1 depicted in FIG. 1.

The second_2 signal line path 62, the first-2 signal line path 52, and a portion of the second signal electrode 24 spanning from the input end 32 to the starting point of the portion of the second signal electrode 24 located along the third branching waveguide 20 are disposed each in a straight line and oblique to the longitudinal direction of the first substrate 3. The second_1 signal line path 61, the first-1 signal line path 51, and a portion of the first signal electrode 14 spanning from the input end 31 to the starting point of the portion of the first signal electrode 14 located along the first branching waveguide 10 may be disposed each in a straight line and oblique to the longitudinal direction of the first substrate 3.

The interval between the input end 63 of the second_1 signal line path 61 and the input end 64 of the second_2 signal line path 62 may be longer than the interval between the input end 53 of the first-1 signal line path 51 and the input end 54 of the first-2 signal line path 52 as in the optical modulator 1 depicted in FIG. 3. The interval between the input end 53 of the first-1 signal line path 51 and the input end 54 of the first-2 signal line path 52 may be longer than the interval between the input end 31 of the first signal electrode 14 and the input end 32 of the second signal electrode 24 as in the optical modulator 1 depicted in FIG. 4. Other components in the sixth example are identical to those of the optical modulator 1 depicted in FIG. 1 and therefore, are given the same reference numerals used in FIG. 1 and will not again be described.

According to the optical modulator 1 depicted in FIG. 7, such a length of the signal path can be reduced as that from the input end 64 of the second_2 signal line path 62 to the starting point of a portion of the second signal electrode 24 located along the third branching waveguide 20. Therefore, the band of the second optical modulating unit 7 can be widened. The length of the signal path from the input end 64 of the second_2 signal line path 62 to the starting point of the portion of the second signal electrode 24 located along the third branching waveguide 20, and the length of the signal path from the input end 63 of the second_1 signal line path 61 to the starting point of a portion of the first signal electrode 14 located along the first branching waveguide 10 can both be reduced maintaining the balance between the lengths of these signal paths. Therefore, the propagation loss of any high-frequency signal can be reduced and the modulation band can be widened. The driving voltage during high-speed driving can be reduced.

Figure 8:
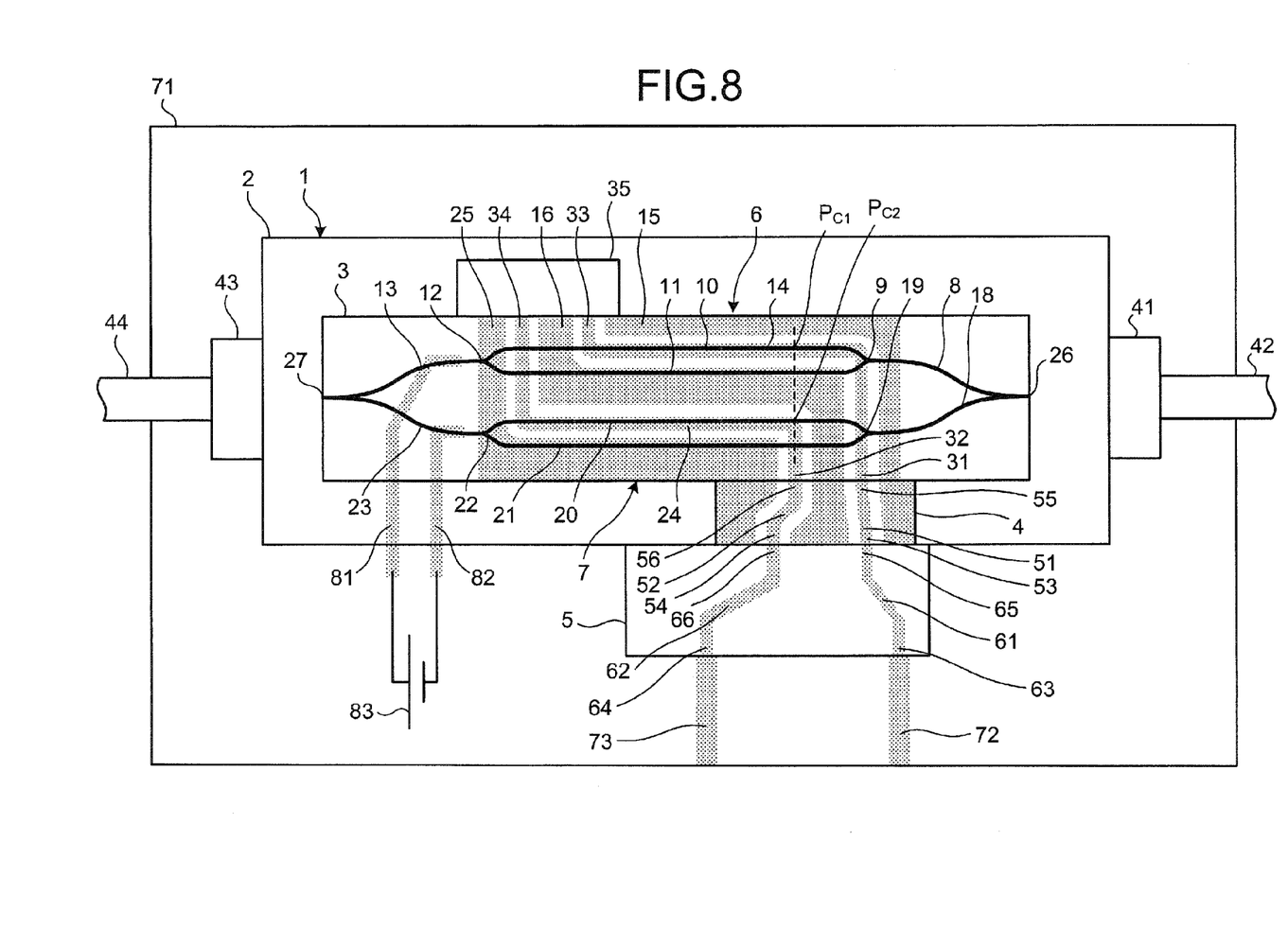
FIG. 8 is an explanatory diagram of a seventh example of the optical modulator according the embodiment.

FIG. 8 is an explanatory diagram of a seventh example of the optical modulator according the embodiment. In an optical modulator 1 depicted in FIG. 8, DC electrodes 81 and 82 are further included respectively disposed along the first and the second output waveguides 13 and 23 in the optical modulator 1 depicted in FIG. 1. In the optical modulator 1 depicted in FIG. 8, a bias 83 may be supplied to the DC electrodes 81 and 82 and, thereby, the phases of the outputs from the two Mach-Zehnder optical waveguides may be adjusted such that the difference between the phases is 90 degrees. Each of the outputs from the Mach-Zehnder optical waveguides may be modulated based on differential phase shift keying (DPSK) that modulates each of the outputs using two values of "0" and "π". Thereby, a quadrature phase shift keying (QPSK) modulation signal can be produced.

The second_2 signal line path 62 may be disposed obliquely to the longitudinal direction of the first substrate 3 as in the optical modulator 1 depicted in FIG. 5. The second_1 signal line path 61 may be disposed obliquely to the longitudinal direction of the first substrate 3 matched with the interval between the input end 63 of the second_1 signal line path 61 and the input end 64 of the second_2 signal line path 62.

The interval between the input end 63 of the second_1 signal line path 61 and the input end 64 of the second_2 signal line path 62 may be longer than the interval between the input end 53 of the first-1 signal line path 51 and the input end 54 of the first-2 signal line path 52 as in the optical modulator 1 depicted in FIG. 3. The interval between the input end 53 of the first-1 signal line path 51 and the input end 54 of the first-2 signal line path 52 may be longer than the interval between the input end 31 of the first signal electrode 14 and the input end 32 of the second signal electrode 24 as in the optical modulator 1 depicted in FIG. 4. Other components in the seventh example are identical to those of the optical modulator 1 depicted in FIG. 1 and therefore, are given the same reference numerals used in FIG. 1 and will not again be described.

Similarly, the optical modulator 1 depicted in FIGS. 3 and 4 to 7 may be adapted to produce a QPSK modulation signal.

Figure 9:
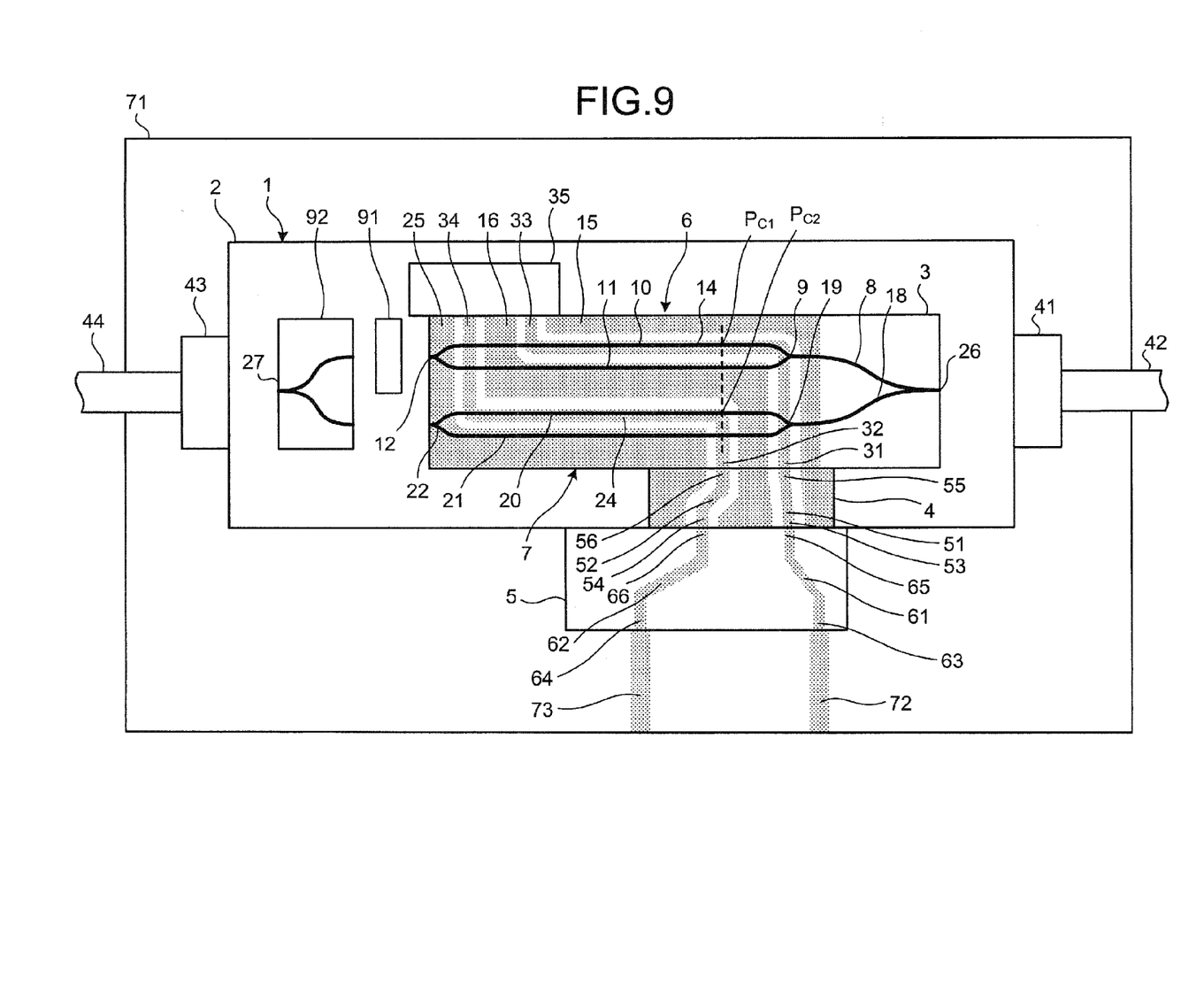
FIG. 9 is an explanatory diagram of an eighth example of the optical modulator according to the embodiment.

FIG. 9 is an explanatory diagram of an eighth example of the optical modulator according to the embodiment. In an optical modulator 1 depicted in FIG. 9, the output from the one Mach-Zehnder optical waveguide whose polarization beam is rotated by 90 degrees by a polarization beam rotating device 91 is coupled with the output from the other Mach-Zehnder optical waveguide by a polarization beam combiner (PBC) 92 in the optical modulating apparatus 1 depicted in FIG. 1. Thereby, a polarization beam multiplexed signal can be produced and output from the polarization beam combiner 92.

The second_2 signal line path 62 may be disposed obliquely to the longitudinal direction of the first substrate 3 as in the optical modulator 1 depicted in FIG. 5. The second_1 signal line path 61 may be disposed obliquely to the longitudinal direction of the first substrate 3 matched with the interval between the input end 63 of the second_1 signal line path 61 and the input end 64 of the second_2 signal line path 62.

The interval between the input end 63 of the second_1 signal line path 61 and the input end 64 of the second_2 signal line path 62 may be longer than the interval between the input end 53 of the first-1 signal line path 51 and the input end 54 of the first-2 signal line path 52 as in the optical modulator 1 depicted in FIG. 3. The interval between the input end 53 of the first-1 signal line path 51 and the input end 54 of the first-2 signal line path 52 may be longer than the interval between the input end 31 of the first signal electrode 14 and the input end 32 of the second signal electrode 24 as in the optical modulator 1 depicted in FIG. 4. Other components in the eighth example are identical to those of the optical modulator 1 depicted in FIG. 1 and therefore, are given the same reference numerals used in FIG. 1 and will not again be described.

Similarly, the optical modulator 1 depicted in each of FIGS. 3 and 4 to 7 may be adapted to produce a polarization beam multiplexed signal.

Figure 10:
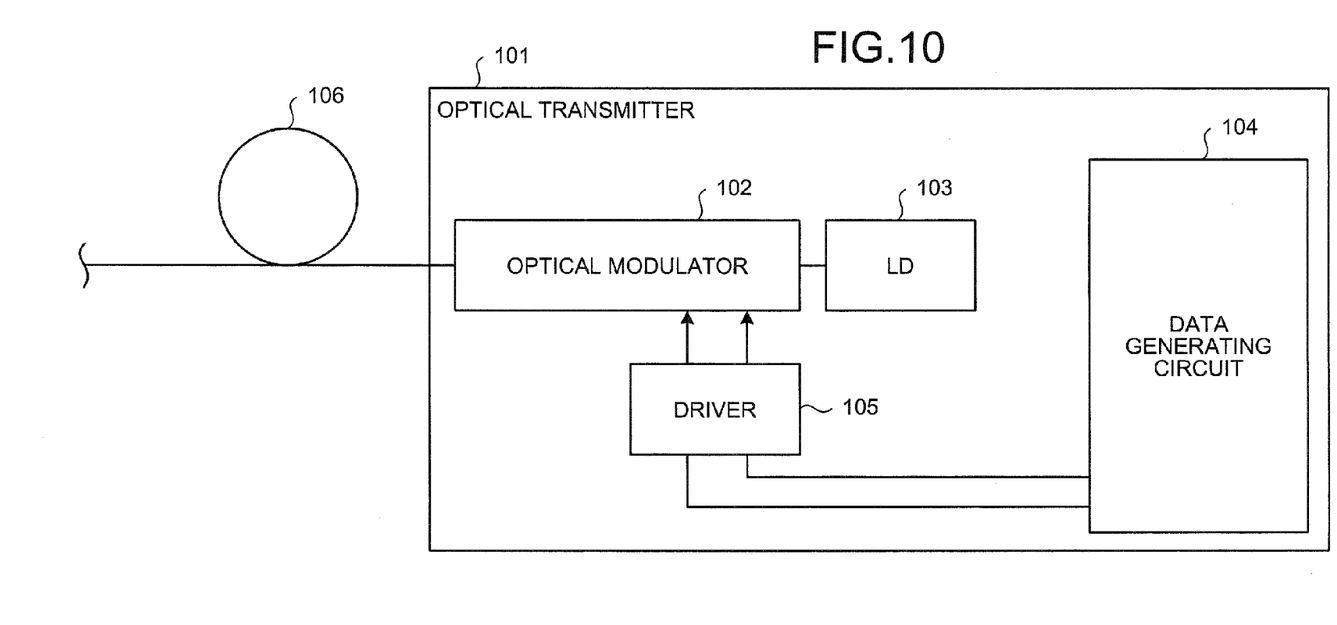
FIG. 10 is an explanatory diagram of an example of an optical transmitter according to the embodiment.

FIG. 10 is an explanatory diagram of an example of an optical transmitter according to the embodiment. As depicted in FIG. 10, the optical transmitter 101 includes an optical modulator 102, a light emitting element 103, a data generating circuit 104, and a driver 105.

The light emitting element 103 emits a light beam. A laser diode (LD) is an example of the light emitting element 103. The data generating circuit 104 produces modulation data. The driver 105 produces an electrical signal having an amplitude that corresponds to the modulation data output from the data generating circuit 104. The optical modulating unit 102 executes the modulation of the light beam emitted from the light emitting element 103, based on the electrical signal output from the driver 105. The optical modulator 1 depicted in each of the FIGS. 1, 3 and 4 to 9 is an example of the optical modulator 102 of the optical transmitter 101.

The light beam output from the optical modulator 102 may be output to an optical fiber 106 through a connector not depicted.

According to the optical transmitter depicted in FIG. 10, use of the optical modulator 1 depicted in each of FIGS. 1, 3, and 4 to 9 as the optical modulator 102 enables reduction of the size of a package of the optical modulator 102. Even when the pitch of the plural signal wires connecting the driver 105 and the optical modulator 102 to each other is wider than the pitch of the signal electrodes of the modulator chip, conversion of the pitch can be executed on the flexible circuit board of the optical modulator 102.

The optical modulator 1 depicted in each of FIGS. 1, 3, and 4 to 9 includes the two Mach-Zehnder optical waveguides and the two signal electrodes. However, the above is similarly applied to the case where the optical modulator 1 includes three or more Mach-Zehnder optical waveguides and three or more signal electrodes.

According to the optical modulator and the optical transmitter, the size of the package of the optical modulator can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulator comprising:
   a first substrate that includes:
   a Mach-Zehnder optical waveguide that is formed on the first substrate having an electro-optical effect;
   a signal electrode and a ground electrode that are disposed along a pair of branching waveguides positioned between an optical branching unit and an optical coupling unit of the Mach-Zehnder optical waveguide;
   plural optical modulating units that are disposed in parallel, and respectively modulate a light beam propagating in the Mach-Zehnder optical waveguide; and
   an output optical coupling unit that couples modulated light beams output from the optical modulating units;
   a second substrate that is disposed separately from the first substrate and has plural first signal line paths corresponding to the optical modulating units;
   a flexible circuit board having plural second signal line paths corresponding to the optical modulating units, wherein
   first input ends of input electrodes of the optical modulating units on the first substrate are each supplied the electrical signal and are disposed side by side on one side face of the first substrate,
   when base points are independently set such that each optical path length from the output optical coupling unit in the branching waveguide disposed along the signal electrode of the branching waveguides of the optical modulating units to the base points is equivalent, each electrical length from an input end of each signal electrode to each respective base point differs,
   second input ends of the first signal line paths on the second substrate are respectively supplied the electrical signals respectively corresponding to the optical modulating units and are disposed side by side on one side face of the second substrate, and second output ends electrically connected to the first input ends are disposed side by side on another side face of the second substrate,
   third input ends of the second signal line paths on the flexible circuit board are respectively supplied the electrical signals respectively corresponding to the optical modulating units and are disposed side by side on one side face of the flexible circuit board, and third output ends electrically connected to the third input ends are disposed side by side on another side face of the flexible circuit board,
   electrical lengths from the third input ends of the second signal line paths to the third output ends thereof respectively differ, and
   electrical lengths of signal paths respectively corresponding to the optical modulating units are equivalent, the electrical lengths are the signal paths that are from the third input ends to the base points on the signal electrodes.

2. The optical modulator according to claim 1, wherein an interval between the third input ends of the second signal line paths on the flexible circuit board is different from an interval that corresponds thereto and is between the second input ends of the first signal line paths on the second substrate.

3. The optical modulator according to claim 2, wherein the interval between the third input ends of the second signal line paths on the flexible circuit board is longer than the interval that corresponds thereto and is between the second input ends of the first signal line paths on the second substrate, and
   the interval between the second input ends of the first signal line paths on the second substrate is longer than an interval that corresponds thereto and is between the first input ends of the signal electrodes on the first substrate.

4. The optical modulator according to claim 1, wherein a central line between the adjacent third input ends of the second signal line paths on the flexible circuit board deviates from a central line that corresponds thereto and is between the adjacent second input ends of the first signal line paths on the second substrate.

5. The optical modulator according to claim 1, wherein the second signal line paths on the flexible circuit board are disposed obliquely to a longitudinal direction of the first substrate.

6. The optical modulator according to claim 5, wherein the first signal line paths on the second substrate are disposed obliquely to the longitudinal direction of the first substrate, and
   the first signal line paths and the corresponding second signal line paths on the flexible circuit board are each disposed in a straight line.

7. The optical modulator according to claim 6, wherein a portion spanning from an input end of each of the signal electrodes on the first substrate to a portion located along the branching waveguide is disposed obliquely to the longitudinal direction of the first substrate, and
   a portion spanning from an input end of each of the signal electrodes to a portion located along the branching waveguide, the corresponding first signal line path on the second substrate, and the corresponding second signal line path on the flexible circuit board are respectively formed in a straight line.

8. The optical modulator according to claim 1, wherein sums corresponding to each of the optical modulating units are equivalent, the sums respectively being a sum of a product of a length and a loss per unit length of the second signal line paths on the flexible circuit board, a product of a length and a loss per unit length of the first signal line paths on the second substrate, and a product of a loss per unit length of the signal electrodes on the first substrate and a length of a signal path from the input end of the signal electrode to the base point.

9. The optical modulator according to claim 1, wherein the optical modulator is a QPSK modulator.

10. The optical modulator according to claim 1, wherein the optical modulator is a polarization beam multiplex modulator.

11. An optical transmitter comprising:
a light emitting element that emits light;
a data generating circuit that generates modulation data;
a driver that generates an electrical signal corresponding to the modulation data output from the data generating circuit; and
an optical modulator that based on the electrical signal output from the driver, modulates the light emitted from the light emitting element; wherein
the optical modulator includes:
a first substrate that includes:
a Mach-Zehnder optical waveguide that is formed on the first substrate having an electro-optical effect;
a signal electrode and a ground electrode that are disposed along a pair of branching waveguides positioned between an optical branching unit and an optical coupling unit of the Mach-Zehnder optical waveguide;
plural optical modulating units that are disposed in parallel, and respectively modulate a light beam propagating in the Mach-Zehnder optical waveguide; and
an output optical coupling unit that couples modulated light beams output from the optical modulating units;
a second substrate that is disposed separately from the first substrate and has plural first signal line paths corresponding to the optical modulating units;
a flexible circuit board having plural second signal line paths corresponding to the optical modulating units, wherein
first input ends of input electrodes of the optical modulating units on the first substrate are each supplied the electrical signal and are disposed side by side on one side face of the first substrate,
when base points are independently set such that each optical path length from the output optical coupling unit in the branching waveguide disposed along the signal electrode of the branching waveguides of the optical modulating units to the base points is equivalent, each electrical length from an input end of each signal electrode to each respective base point differs,
second input ends of the first signal line paths on the second substrate are respectively supplied the electrical signals respectively corresponding to the optical modulating units and are disposed side by side on one side face of the second substrate, and second output ends electrically connected to the first input ends are disposed side by side on another side face of the second substrate,
third input ends of the second signal line paths on the flexible circuit board are respectively supplied the electrical signals respectively corresponding to the optical modulating units and are disposed side by side on one side face of the flexible circuit board, and third output ends electrically connected to the third input ends are disposed side by side on another side face of the flexible circuit board,
electrical lengths from the third input ends of the second signal line paths to the third output ends thereof respectively differ, and
electrical lengths of signal paths respectively corresponding to the optical modulating units are equivalent, the electrical lengths are the signal paths that are from the third input ends to the base points on the signal electrodes.

12. The optical transmitter according to claim 11, wherein
an interval between the third input ends of the second signal line paths on the flexible circuit board is longer than the interval that corresponds thereto and is between the second input ends of the first signal line paths on the second substrate,
an interval between second input ends of the first signal line paths on the second substrate is longer than an interval that corresponds thereto and is between first input ends of the signal electrodes on the first substrate,
a central line between the adjacent third input ends of the second signal line paths on the flexible circuit board deviates from a central line that corresponds thereto and is between the adjacent first input ends of the signal electrodes on the first substrate.

13. The optical transmitter according to claim 11, wherein
the second signal line paths on the flexible circuit board are disposed obliquely to a longitudinal direction of the first substrate,
the first signal line paths on the second substrate are disposed obliquely to the longitudinal direction of the first substrate, and
the first signal line paths and the corresponding second signal line paths are each disposed in a straight line.

14. The optical transmitter according to claim 11, wherein sums corresponding to each of the optical modulating units are equivalent, the sums respectively being a sum of a product of a length and a loss per unit length of the second signal line paths on the flexible circuit board, a product of a length and a loss per unit length of the first signal line paths on the second substrate, and a product of a length and a loss per unit length of the signal electrodes on the first substrate.

* * * * *